Oct. 2, 1951     L. H. CORMIER     2,569,558
HEIGHT GAUGE
Filed Aug. 19, 1946     2 Sheets-Sheet 1
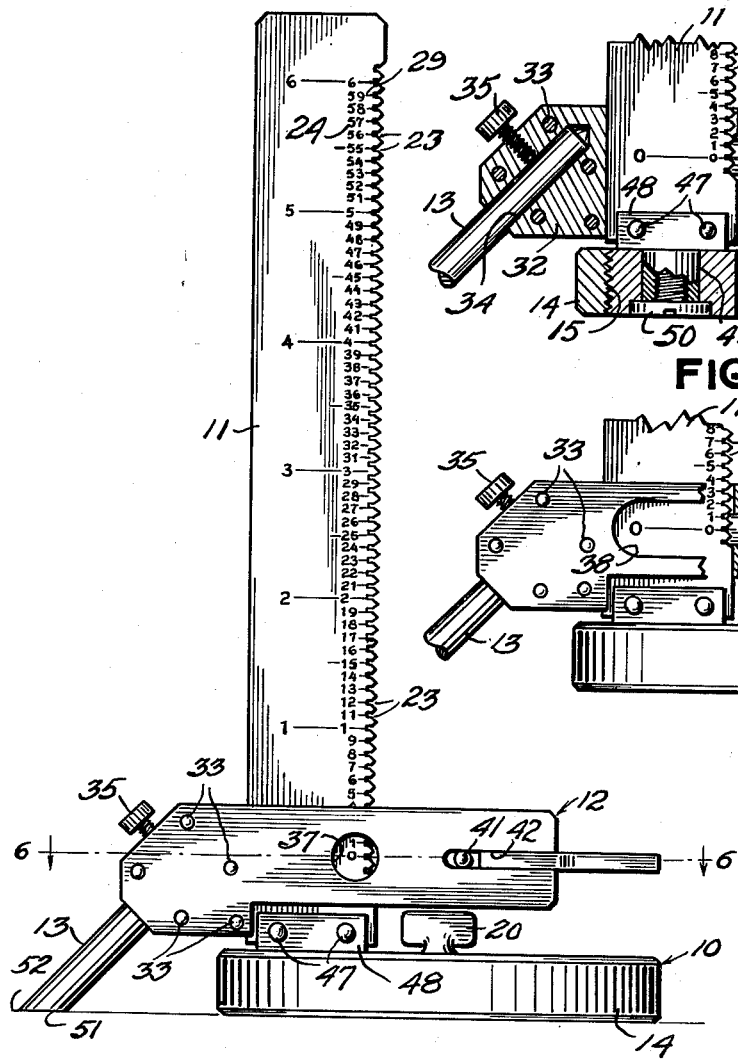
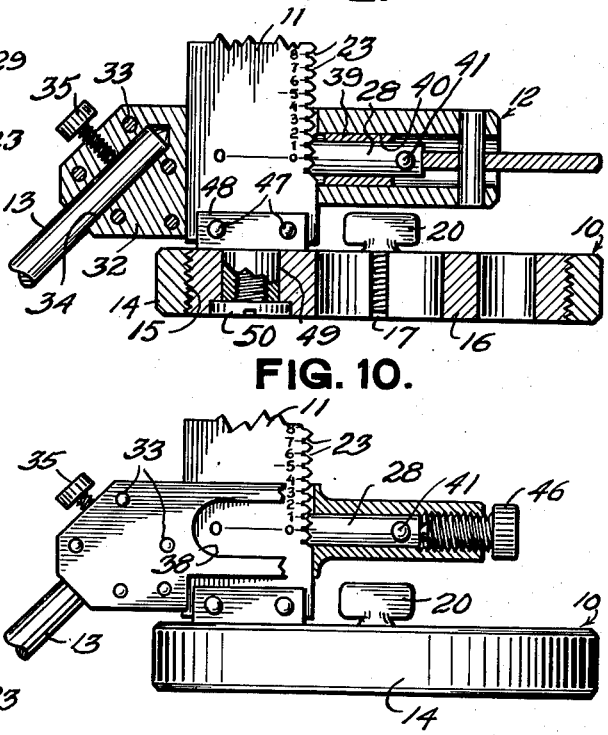
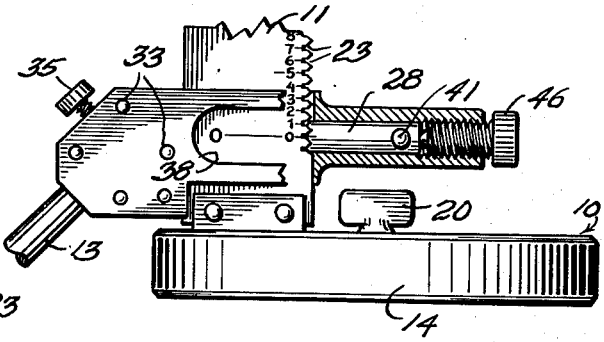
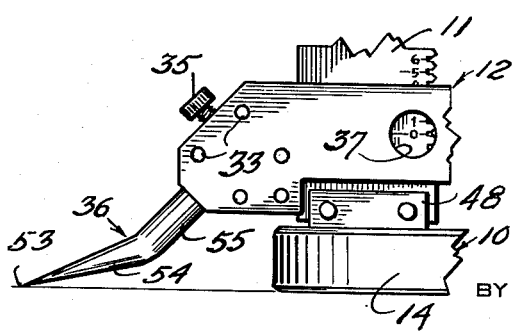
INVENTOR.
Leo H. Cormier
BY
ATTORNEYS Oct. 2, 1951      L. H. CORMIER      2,569,558
HEIGHT GAUGE
Filed Aug. 19, 1946      2 Sheets—Sheet 2
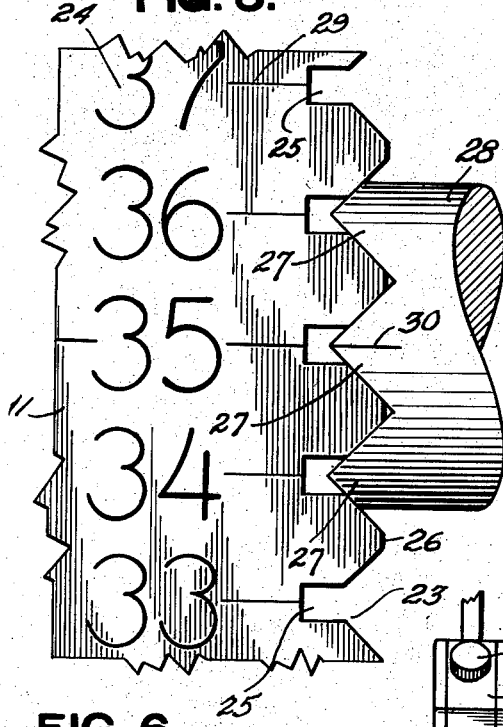
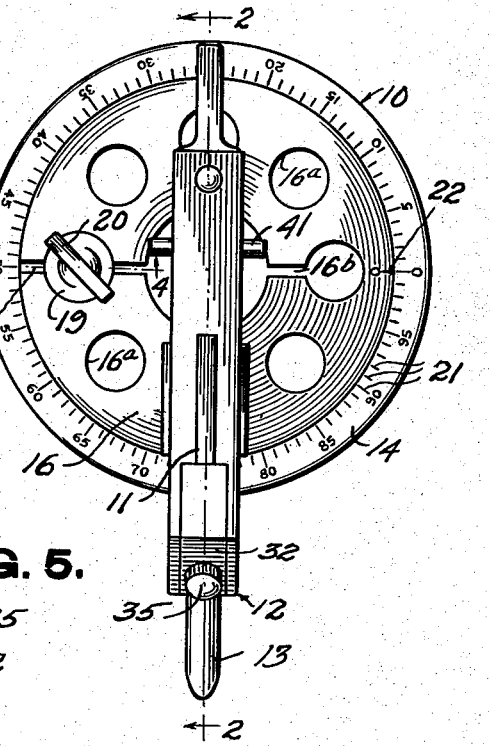
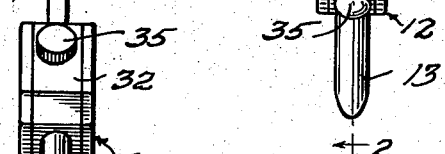
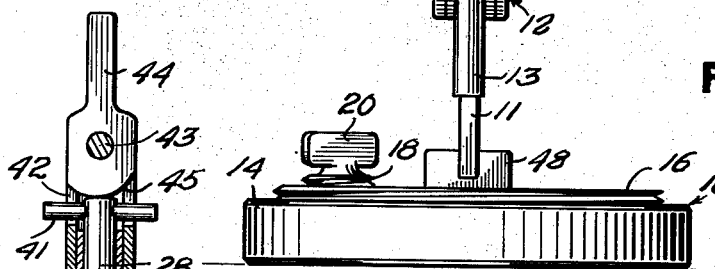
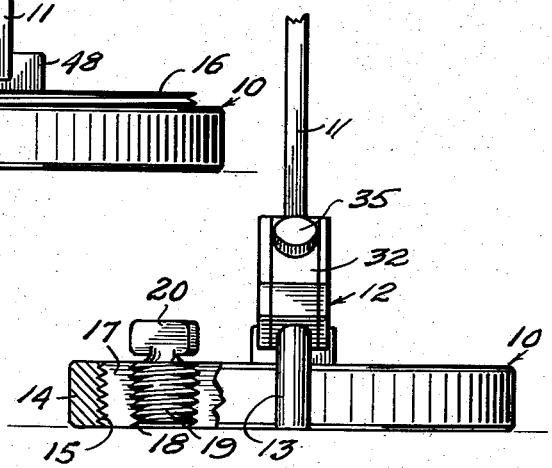
INVENTOR.
Leo H. Cormier
BY *Lancaster, Allwine & Rommel*
ATTORNEYS.

Patented Oct. 2, 1951

2,569,558

UNITED STATES PATENT OFFICE 2,569,558

HEIGHT GAUGE

Leo H. Cormier, Detroit, Mich.

Application August 19, 1946, Serial No. 691,462

1 Claim. (Cl. 33—169)

This invention relates to height gauges and has for its principal objects to provide a tool of this character having a high degree of accuracy, simple in construction, sturdy, and capable of mass production so that the invention may be brought within the means of a vast number of persons who may have use for precision tools.

Another object of the invention is to provide a height gauge constructed and aranged so as to make it easier to set the scriber, and according to the size for heights up to six inches, by way of example within a few thousandths of a unit of measurement.

Another object of the invention is to provide a height gauge having graduation marks and indicia thereon so arranged that a toolmaker need not strain his eyes to set it for the desired measurement or scribing of a line.

A further object of the invention is to provide a height gauge which may be easily disassembled for shipment and storage, and easily and quickly assembled and set at zero, or to the desired graduation or graduations, according to the measurement to be made.

Other objects and advantages of the invention will appear in the following detailed description, taken in connection with the accompanying drawings, forming a part of this specification, and in which drawings:

Fig. 1 is a side elevation of the preferred embodiment of a height gauge in accordance with my invention.

Fig. 2 is a fragmentary vertical sectional view thereof taken on line 2—2 of Fig. 3.

Fig. 3 is a plan view thereof.

Fig. 4 is a front elevation view thereof, a portion being broken away along the section line 4—4 on Fig. 3.

Fig. 5 is a similar front elevation showing the scriber in an elevated and adjusted position.

Fig. 6 is a detail sectional view taken on line 6—6 of Fig. 1.

Fig. 7 is a similar fragmentary sectional view of a portion of Fig. 6 showing the gauge in unlocked position.

Fig. 8 is a fragmentary elevation on an enlarged scale illustrating the gauge scale and an associated part.

Fig. 9 is a fragmentary side elevation of a modified form of height gauge in accordance with any invention, and Fig. 10 is a side elevation of a height gauge having a further modified form of scriber support in accordance with my invention.

Referring to the drawings, particularly Fig. 1 the height gauge comprises, in general, a base 10, having a vertically adjustable scale standard 11 mounted thereon, a vertically movable slide 12 on the scale standard, and a scriber 13 carried by the slide which may be employed in measuring as well as for marking height on objects with which the gauge is used.

More specifically the base 10, as best shown in Figs. 2 to 5 inclusive, comprises an exterior ring 14 having interior threads 15 preferably threaded ten threads to an inch in practice though any desired number of threads in either English or Metric system may be employed. Within this exterior ring is a correspondingly threaded expansible split ring 16 having a plurality of slits with one slit 17 entirely opening the ring so that it may be expanded and contracted. In its contracted condition split ring 16 may easily be turned in the threads of exterior ring 14, but in order to lock it in any desired position, in the mid portion of slit 17, the ring is provided with a tapered threaded opening 18 for receiving correspondingly tapered and threaded lock screw 19 having a fingerpiece 20 thereon for turning it for expanding and contracting split ring 16. Split ring 16 is also provided with a plurality of spaced openings 16a which decrease the weight of the instrument and one or more slits 16b into an opening 16a (or openings) allows the ring to yield more readily so that it will be loose for turning in outer ring 14.

With the threading 15 of the rings 14 and 16 ten threads to the inch, each complete turn of the rings with respect to each other represents a height adjustment variation of .100 of an inch and one of the rings, as shown outer ring 14 is provided with a hundred scale divisions 21 and the other, inner split ring 16, is provided with an index 22 for cooperation with scale 21; thus each scale division represents .001 of an inch in height adjustment. This arrangement gives extreme accuracy in the small height adjustments of the gauge which may be added to the larger adjustments of slide 12 along standard 11. These latter adjustments are provided for by notches 23, preferably spaced, with prevision at one tenth of an inch intervals along an edge of standard 11, that is, the pitch of threads 14; and a scale 24 for the sixty notches, for a six inch scale, is placed on the standard for the corresponding notches.

As best shown in Fig. 8 these notches 23 are beveled top and bottom with deep extensions 25 extending inwardly therefrom conveniently in the forms of kerfs having straight upright back walls extending between straight parallel lateral walls which latter are continuations of the bevelled walls of notches 23. These notches 23 are also separated by short vertical walls 26 of the edge of standard 11. By this arrangement the notches may be accurately spaced for receiving teeth 27 of a slide locking plunger 28 which teeth are similarly accurately formed for adjusting the slide 12 with precision as to height on standard 11, noting that the outer edges of teeth 27 extend freely in the extension openings 25 and the bottoms of the teeth are not engaged by points on the edge of the standard whereby the vertical adjustments of the slide may be made with great precision. Scale markings 29 are placed on standard 11 corresponding with the notch spacing and scale numerals 24, and an index 30 is placed on the middle tooth of plunger 28. Thus the height adjustment is equal to the sum of readings of scales 24 and 21, the former in tenths of inches and the latter, as will be readily seen.

As illustrated, slide 12 is formed at an intermediate portion with a vertical opening therethrough having a sliding snug fit on standard 11, the forward end being formed for receiving a socket member 32 (Figs. 2 and 6), suitably secured therein by rivets 33 or the like, its socket 34 being at a downwardly inclined angle and a thumb screw 35 is provided for retaining a scriber 13 preferably of the form illustrated in Fig. 1 in its adjusted position as shown, though, if desired a scriber of any desired type such as the one 36 shown in Fig. 9 may be employed, that is a sharp pointed marker or the like.

A sight opening 37 circular in form as illustrated in Figs. 1 and 9 or an oblong opening 38 as shown in Fig. 10 is formed in the side of slide 12 for viewing the scale 24 and noting that plunger teeth 27 are positioned properly in notches 23.

Plunger 28 is preferably mounted in a bushing 39 fitting in a bore 40 extending through the rear end of slide 12 and the outer end of plunger 28 is provided with a guide pin 41 the ends of which slide in lateral slots 42 in slide 12 as a means for maintaining the teeth 27 in proper relation with respect to notches 23. Back of plunger 28, slide 12 has a vertical pivot 43 on which a lever 44 is mounted to rock, movement thereof being permitted in slots 42 (as best shown in Figs. 6 and 7). Lever 44 has its inner end formed with a cam surface 45 so that when it is extended rearwardly (Fig. 6) it presses plunger 27 into locking engagement with notches 23 in standard 11 and when it is rocked to the right (Fig. 7) the plunger is released therefrom so that the slide may be raised or lowered on the standard.

In the form illustrated in Fig. 10 the wear mounting bushing 39 is omitted and the movement of plunger 28 is controlled by means of a thumb screw 46, as a satisfactory substitute for lever 44. Though possibly not quite as quick to operate it may be produced at a little less expense.

Standard 11 is mounted vertically on base ring 16 so that all vertical walls thereof are at right angles with respect to the base ring 14. In order to maintain the standard at right angles with respect to the planes of base 10, standard 11 is secured by means of rivets 47, or the like, in a vertical slot in the upper part of a mounting block 48. the lower surface of which is finished in a plane to cooperate with the upper supporting surface of split ring 16 of base 10. Block 48, as shown in Fig. 2, has a downwardly extending interiorly threaded tubular connecting element 49 having a relatively snug engagement in a bore through ring 16 and is secured in place therein by means of a screw member 50 threaded into the lower end of connecting element 49. Thus standard 11 may be located in the desired position with respect to base 10 and maintain the stylus or scriber 13 always at the same elevation with respect to the horizontal planes of base 10. It is to be noted that by this mode of assembly and the fact that slide 12 is removable the instrument may be disassembled for storage in a suitable case when not in use or for shipment. Due to the accuracy in the fit of the parts it may be assembled at any time and used for precision work.

Standard 11 being vertical with respect to the planes of base 10, base 10 and standard 11 may be employed, removing slide 12 if desired or necessary, as a square for checking the perpendicularity of objects from a height above the top of base 10.

Referring to Figs. 1 and 2 which show a preferred form of scriber, it will be seen that scriber 13 is formed of a cylindrical rod with its lower end 51 beveled, the plane of the beveled surface being horizontal so that the height of an object may be accurately determined or the gauge set for a given height. Also in so forming the scriber 13 the rod is formed with a relatively sharp point 52 suitable for scribing or marking definite heights on objects.

Scriber 36 illustrated in Fig. 9 has a sharp point 53 at the tip of a tapered end 54 which extends to an angle with respect to the axis of the cylindrical rod body portion 55 of the scriber.

Obviously socket member 32 is adapted to receive other forms of scribers, styluses and the like, or calipering devices and the height gauge is adaptable for various types of measuring and marking or gauging operations.

While I have described highly satisfactory forms of my height gauge in detail, it is obvious that changes may be made therein without departing from the spirit of the invention as defined by the following claim.

I claim:

A height gauge comprising a base, a vertical standard on said base, a scriber slide on said standard, a reciprocable plunger mounted in a bore in the slide normal to an edge of the standard, said standard having V notches providing pairs of upper and lower flat engaging surfaces in its edge at definite spaced intervals therealong with short laterally extending vertical walls of the edge of the standard between the notches and having extended lateral cuts into the standard from the sides of and extending the inner portions of the V notches, said plunger having V-shaped projecting teeth correspondingly spaced on the inner end thereof and having corresponding upper and lower flat side surfaces for full surface engagement with the flat engaging surfaces of the V notches in the edge of the standard, whereby the outer and inner edges of the teeth will be free from engagement with any portions of the standard, and means for urging said plunger into gripping relation with the edge of the standard, with its teeth engaging selected notches in the edge of the standard.

LEO H. CORMIER.

(References on following page)

REFERENCES CITED

The following references are of record in the file of this patent:

UNITED STATES PATENTS

| Number | Name | Date |
|---|---|---|
| 188,756 | Rich | Mar. 27, 1877 |
| 673,307 | Wahlberg | Apr. 30, 1901 |
| 821,721 | Kreutzkamp | May 29, 1906 |
| 924,668 | Jaques | June 15, 1909 |
| 1,181,412 | Schmittner | May 2, 1916 |
| 1,230,627 | Thompson | June 19, 1917 |
| 1,334,217 | Blomberg | Mar. 16, 1920 |
| 1,462,101 | Colson | July 17, 1923 |
| 1,661,944 | Heinz | Mar. 6, 1928 |
| 1,887,220 | Stuckeman | Nov. 8, 1932 |
| 2,144,972 | Hirst | Jan. 24, 1939 |
| 2,151,305 | Serdock | Mar. 21, 1939 |
| 2,252,146 | Walsh | Aug. 12, 1941 |
| 2,353,626 | Schnaars | July 11, 1944 |
| 2,400,715 | Sandberg | May 21, 1946 |

FOREIGN PATENTS

| Number | Country | Date |
|---|---|---|
| 25,739 | Great Britain | 1908 |
| 518,160 | France | Dec. 27, 1920 |